(12) United States Patent
Kwon et al.

(10) Patent No.: US 7,540,540 B2
(45) Date of Patent: Jun. 2, 2009

(54) PIPE COUPLING

(75) Inventors: Jong Ho Kwon, Gyeonggi-do (KR);
Taek Sung Lee, Gyeonggi-do (KR);
Gwang Seok Choi, Seoul (KR)

(73) Assignees: Younwoo Engineering Co., Ltd.,
Paju-Si, Gyeonggi-Do (KR); Tae Hoon Kim, Seoul (KR)

( * ) Notice: Subject to any disclaimer, the term of this patent is extended or adjusted under 35 U.S.C. 154(b) by 0 days.

(21) Appl. No.: 11/652,061

(22) Filed: Jan. 11, 2007

(65) Prior Publication Data
US 2008/0169648 A1  Jul. 17, 2008

(51) Int. Cl.
*F16L 23/00* (2006.01)
(52) U.S. Cl. .................. 285/411; 285/419; 285/420
(58) Field of Classification Search .................. 285/367, 285/373, 411, 419–420
See application file for complete search history.

(56) References Cited
U.S. PATENT DOCUMENTS

| | | | | |
|---|---|---|---|---|
| 1,913,030 A | * | 6/1933 | Hux | 277/336 |
| 1,938,974 A | * | 12/1933 | Oldberg | 285/324 |
| 2,009,744 A | * | 7/1935 | Pfefferle | 277/623 |
| 2,739,018 A | * | 3/1956 | Collett | 175/325.5 |
| 4,429,907 A | * | 2/1984 | Timmons | 285/373 |
| 4,768,813 A | * | 9/1988 | Timmons | 285/373 |
| 2003/0178850 A1 | * | 9/2003 | Dole et al. | 285/420 |
| 2004/0036291 A1 | * | 2/2004 | Dole | 285/367 |

* cited by examiner

*Primary Examiner*—Aaron M Dunwoody
*Assistant Examiner*—Fannie Kee
(74) *Attorney, Agent, or Firm*—Birch, Stewart, Kolasch & Birch, LLP

(57) ABSTRACT

A pipe coupling includes a pair of half members which have a half-ring shape on the x-y plane and a thickness along the z axis, wherein the half member includes a first end on which a circumferential groove is disposed, the circumferential groove including a first groove surface and a second groove surface which are inclined over the x-y plane; and a second end on which a circumferential protrusion is disposed, the circumferential protrusion including a first protrusion surface and a second protrusion surface which are inclined over the x-y plane, wherein the first groove surface and the second groove surface are inclined over the x-z plane in the same angle and direction as the first protrusion surface and the second protrusion surface.

3 Claims, 6 Drawing Sheets

Fig. 1     Prior Art

PIPE COUPLING

BACKGROUND OF THE INVENTION

1. Field of the Invention

The present invention relates to a pipe coupling. Particularly, the present invention relates to a pipe coupling for increasing the tightening force of a first half member and a second half member.

2. Description of the Related Art

A grooved piping system joins two pipes to be sealed without the welding process, and has been used in general buildings, power plants, industrial plants, water supplies, equipment piping, and air-conditioning piping systems.

Since the grooved piping system can join pipes without welding, the working time and costs are greatly reduced, and thus the system has been used for various fields of piping processes.

The grooved piping system comprises a gasket attached to the surface of pipes, and a pipe coupling disposed on the outside of the gasket to exert pressure thereto. The pipe coupling is composed of two half members having an identical shape.

Two grooves each are formed on outer surfaces of the ends of pipes joined to each other, and then the gasket is disposed between the two grooves. And, the pipe-joining process is completed by tightening the two half members of the pipe coupling which cover the gasket, by using a tightening means.

General structure of the pipe coupling having this function is described below.

FIG. 1 is a perspective view of a pipe coupling according to the related art, and shows the first half member 11 and the second half member 12 which are engaged with each other.

As mentioned above, the pipe coupling 10 is composed of a first half member 11 and a second half member 12, each of which is half-ring shaped. Flanges 11a and 12a having connecting holes 11b and 12b, are disposed on both ends of each of the half members 11 and 12.

Also, a pair of protrusions 11c and 12c with predetermined height are disposed on both sides of an inner surface of each of the half members 11 and 12. The protrusions 11c and 12c are received in the grooves disposed on the outer surfaces of the pipes during the pipe-joining process.

The ends of the first half member 11 and the second half member 12 have inclined surfaces 11d and 12d which are inclined over the widthwise direction of the half members 11 and 12 (i.e. the longitudinal direction of the pipe). Here, the inclined surface 1id of the first half member 11 slidably contacts the inclined surface 12d of the second half member 12 corresponding thereto. Therefore, as the first and second half members 11 and 12 are met and tightened to each other, they slide on each other, thereby tightly joining the pipes.

When the two pipes meet each other, the gasket is disposed to cover the outer surfaces of the ends of the pipes. Then, the first and second half members 11 and 12 are disposed to correspond to each other, with covering the gasket.

In order to join the first half member 11 and the second half member 12, bolt 19 and nut 18 can be used as the tightening means. As the bolt 19 is inserted into the connecting holes 11b and 12b disposed on the flanges 11a and 12a, and tightened by the nut 18, the first half member 11 and the second half member 12 tighten the pipes, with sliding along the inclined surfaces 11d and 12d.

By tightening the first and second half members 11 and 12, the gasket disposed inside the first and second half members 11 and 12 is compressed. Consequently, the two pipes are joined and sealed by the gasket and the pipe coupling 10.

Here, the contacting surfaces of the first and second half members 11 and 12 are the inclined planes 11d and 12d, and so the tightening force is exerted into the inclined direction (i.e. the arrow direction in FIG. 1). Also, the inclined direction of each of the half members 11 and 12 is opposite at both ends, and the direction of the tightening force is also opposite to each other. Therefore, the twisting force is generated by the pipe coupling 10.

In case the pressure of the pipes is rapidly increased, the protrusions 11c and 12c of the first and second half members 11 and 12 may be easily separated from the grooves of the pipes by the twisting force, which weakens the pipe-sealing ability of the gasket. Also, the twisting force exerted onto the first and second half members 11 and 12 is transferred to the gasket, to weaken the pipe-sealing ability of the gasket.

SUMMARY OF THE INVENTION

The object of the present invention is to provide a pipe coupling which can improve the tightening force of half members, and can tightly join pipes.

The pipe coupling according to one embodiment of the present invention may comprise a pair of half members which have a half-ring shape on the x-y plane and a thickness along the z axis, wherein the half member includes a first end on which a circumferential groove is disposed, the circumferential groove comprising a first groove surface and a second groove surface which are inclined over the x-y plane; and a second end on which a circumferential groove is disposed, the circumferential protrusion comprising a first protrusion surface and a second protrusion surface which are inclined over the x-y plane, wherein the first groove surface and the second groove surface are inclined over the x-y plane in the same angle and direction as the first protrusion surface and the second protrusion surface.

The pipe coupling of the present invention can prevent the twisting force exerted on the pipes and gaskets, and can increase the tightening force by enabling the first and second half members to slide into the direction which is parallel with the plane of the end of the pipe.

BRIEF DESCRIPTION OF THE DRAWINGS

Embodiments will be described in detail with reference to the following drawings in which same reference numerals refer to same elements.

DETAILED DESCRIPTION OF THE INVENTION

Hereinafter, the pipe coupling according to one embodiment of the present invention will be explained in more detail with reference to the accompanying drawings.

Figure 1:
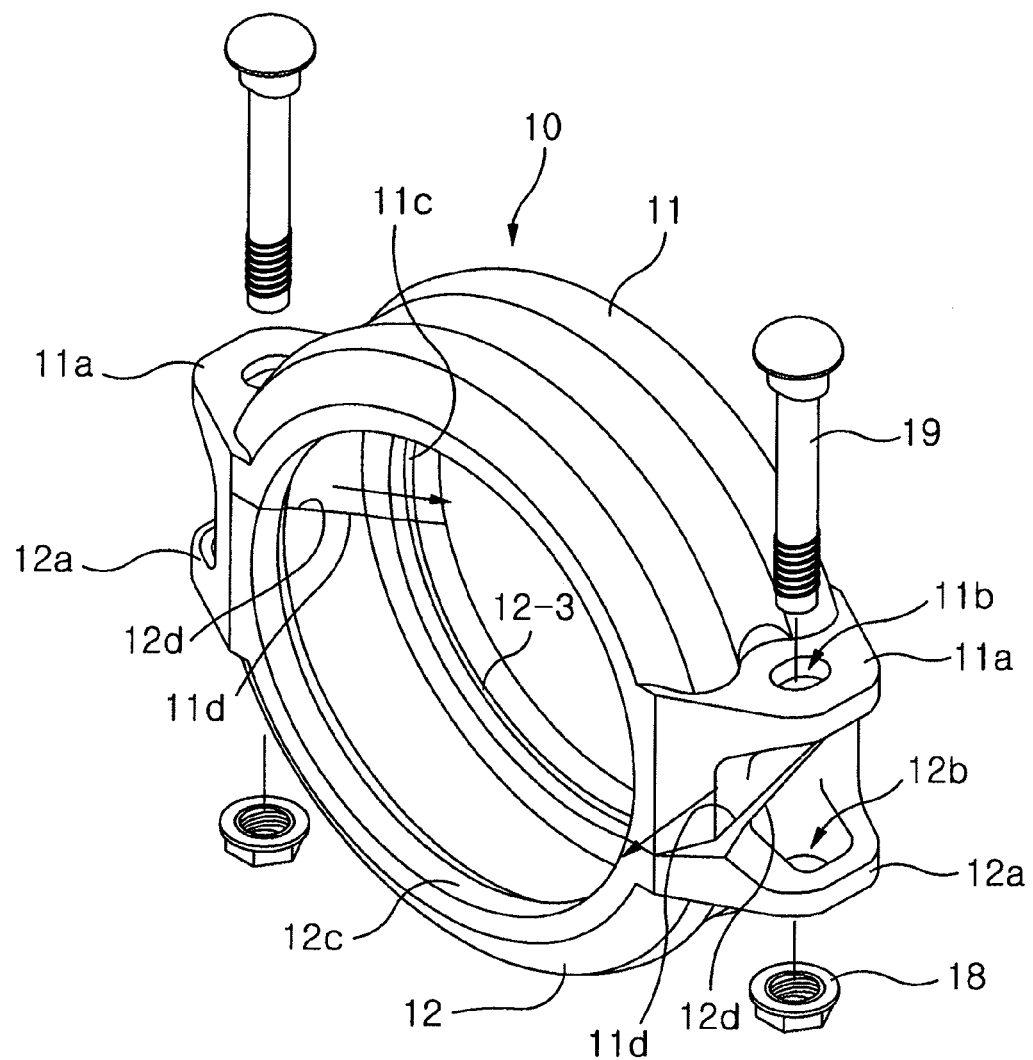
FIG. 1 is a perspective view of a pipe coupling according to the related art.
Figure 2:
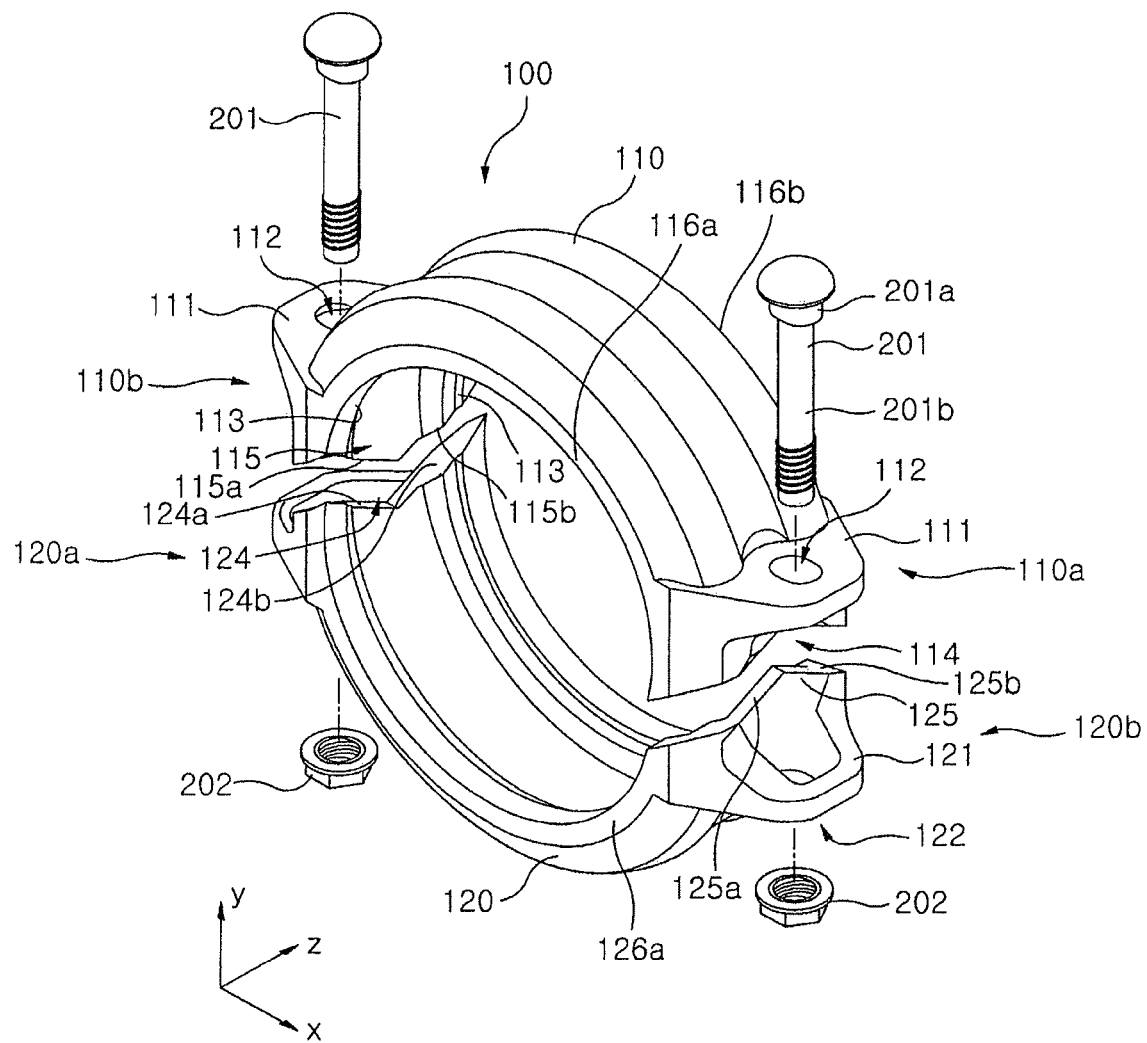
FIG. 2 is an exploded perspective view of a pipe coupling according to one embodiment of the present invention.

FIG. 2 is an exploded perspective view of the pipe coupling according to one embodiment of the present invention.

The pipe coupling 100 according to one embodiment of the present invention comprises a pair of half members 110 and 120 which have the same shape.

The first half member 110 is half-ring shaped. Flanges 111 having a connecting hole 112 are disposed at both ends of the first half member 110.

A pair of protrusions 113 with predetermined height are disposed on both sides of an inner surface of the first half member 110. The protrusions 113 are received in the grooves disposed on the outer surfaces of the pipes during the pipe-joining process.

A circumferential groove 114 is disposed on a first end 110a of the first half member 110, and a circumferential protrusion 115 is disposed on a second end 110b of the first half member 110. The shape of the circumferential groove 114 corresponds to that of the circumferential protrusion 115.

Figure 3:
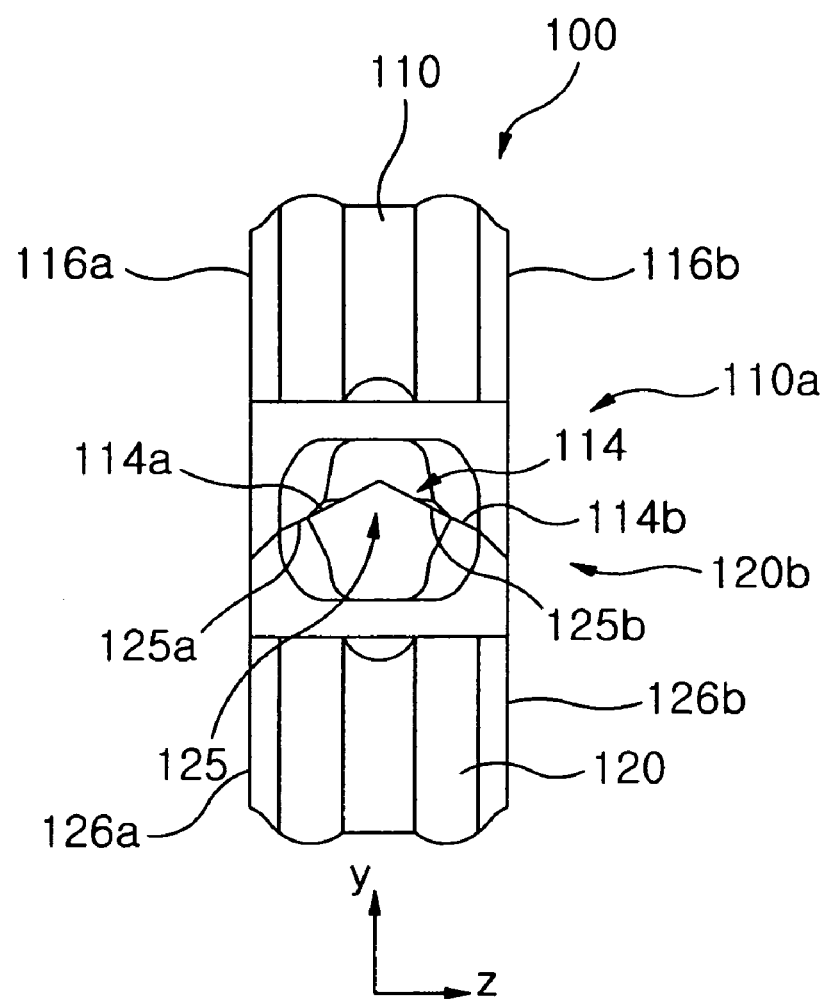
FIG. 3 is a side view of the pipe coupling according to one embodiment of the present invention.

FIG. 3 is a side view of the pipe coupling according to one embodiment of the present invention. FIG. 3 shows that the first half member 110 and the second half member 120 are engaged with each other.

The circumferential groove 114 disposed on the first end 110a of the first half member 110 is composed of a first groove surface 114a inclined over a first edge 116a (i.e. x-y plane) of the first half member 110; and a second groove surface 114b inclined over a second edge 116b (i.e. x-y plane) of the first half member 110. The circumferential groove 114 can be V-shaped by the first groove surface 114a and the second groove surface 114b.

The circumferential protrusion 125 disposed on the second end 120b of the second half member 120 is composed of a first protrusion surface 125a inclined over a first edge 126a (i.e. x-y plane) of the second half member 120; and a second protrusion surface 125b inclined over a second edge 126b (i.e. x-y plane) of the second half member 120.

The first groove surface 114a of the first half member 110 corresponds to the first protrusion surface 125a of the second half member 120; and the second groove surface 114b of the first half member 110 corresponds to the second protrusion surface 125b of the second half member 120.

Also, the shape of the circumferential protrusion 115 of the first half member 110 is the same as that of the circumferential protrusion 125 of the second half member 120; and the shape of the circumferential groove 124 of the second half member 120 is the same as that of the circumferential groove 114 of the first half member 110. Therefore, the same explanations on the circumferential protrusion 115 and the circumferential groove 124 are omitted.

Figure 4:
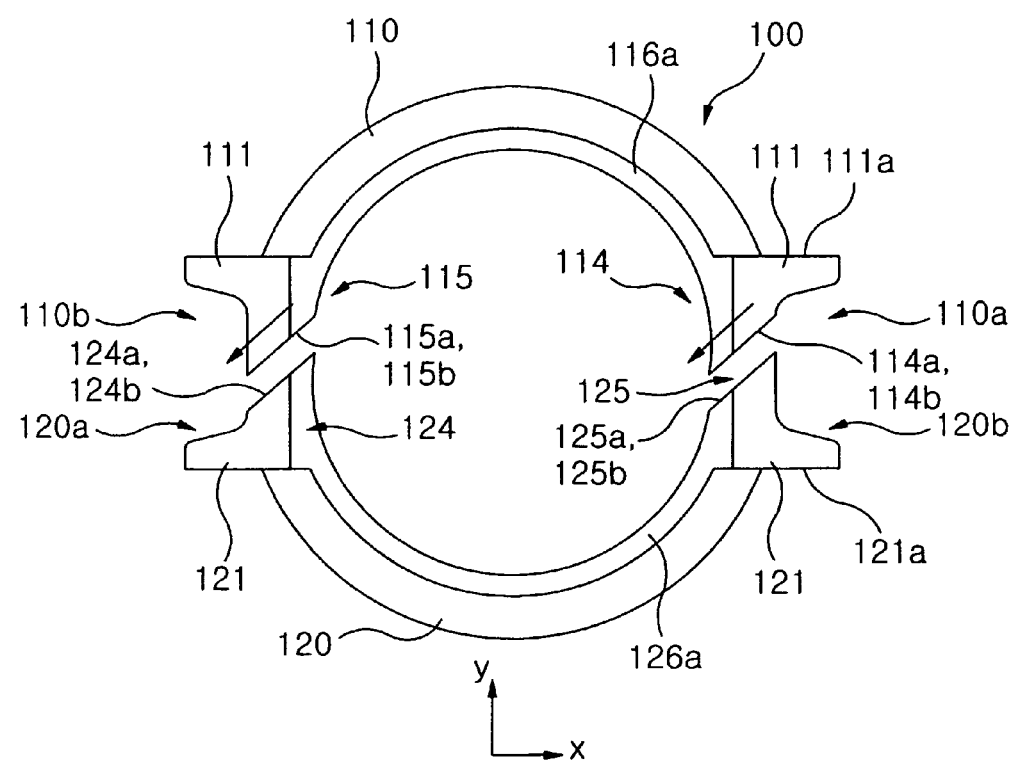
FIG. 4 is a front view of the pipe coupling according to one embodiment of the present invention.

FIG. 4 is a front view of the pipe coupling according to one embodiment of the present invention. For the convenience of explanation, FIG. 4 shows that the first half member 110 and the second half member 120 are spaced apart from each other.

The first and second groove surfaces 114a and 114b of the circumferential groove 114 of the first half member 110 are inclined over the flange surface 111a or 121a (i.e. x-z plane) in the same angle and direction as the first and second protrusion surfaces 125a and 125b of the circumferential protrusion 125 of the second half member 120.

Also, the first and second protrusion surfaces 115a and 115b of the circumferential protrusion 115 of the first half member 110 are inclined over the flange surface 111a or 121a in the same angle and direction as the first and second groove surfaces 124a and 124b of the circumferential groove 124 of the second half member 120.

Figure 5:
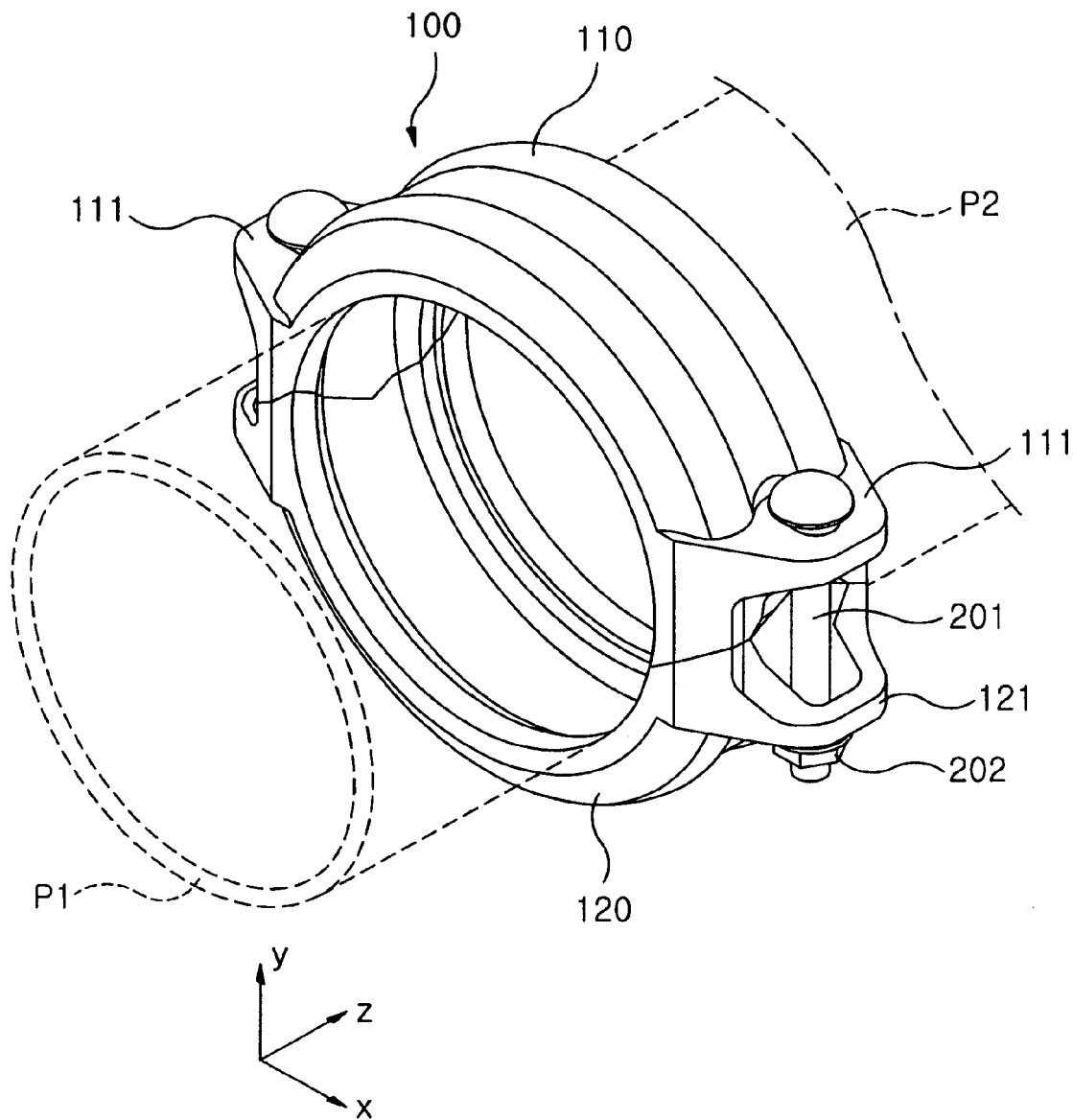
FIG. 5 is a perspective view of the pipe coupling according to one embodiment of the present invention used in the pipe-joining process.

FIG. 5 is a perspective view showing use of the pipe coupling according to one embodiment of the present invention.

The pipes P1 and P2 are joined by the first half member 110 and the second half member 120.

When the ends of the pipes P1 and P2 meet each other, the gasket (not shown) is disposed to cover the outer surfaces of the ends of the pipes P1 and P2. Then, the first and second half members 110 and 120 are correspondingly disposed to meet each other, with covering the gasket.

In order to join the first half member 110 and the second half member 120, bolts 201 and nuts 202 can be used as the tightening means. As the bolts 120 are inserted into the connecting holes 112 and 122 disposed on the flanges 111 and 121, and are tightened by the nuts 202, the gasket disposed in the first and second half members 110 and 120 is compressed. Consequently, the pipes P1 and P2 are joined and sealed by the gasket and the pipe coupling 100.

The circumferential groove 114 of the first half member 110 receives the circumferential protrusion 125 of the second half member 120, and the circumferential protrusion 115 of the first half member 110 is received in the circumferential groove 124 of the second half member 120. Therefore, the first half member 110 and the second half member 120 are tightened well.

In the pipe coupling according to one embodiment of the present invention, when the bolt 201 is tightened by the nut 202 whereby the tightening force is exerted on the first and second half members 110 and 120, the first groove surfaces 114a and 114b of the circumferential groove 114 of the first half member 110 slide in the inclined direction (i.e. the arrow direction in FIG. 4), with contacting the first and second protrusion surfaces 125a and 125b.

Therefore, the tightening force generated by the first and second half members 110 and 120 is exerted to the radial direction of the pipes, in parallel with the plane of the ends of the pipes P1 and P2.

Since the tightening force is exerted in parallel with the plane of the ends of the pipes P1 and P2, the twisting force exerted on the pipes P1 and P2 and the gasket is not generated. Therefore, there are no phenomena that the protrusions 113 of the first and second half members 110 and 120 are easily separated from the grooves of the pipes P1 and P2, and that the gasket is twisted by the twisting force, whereby the sealing function is not damaged.

Figure 6:
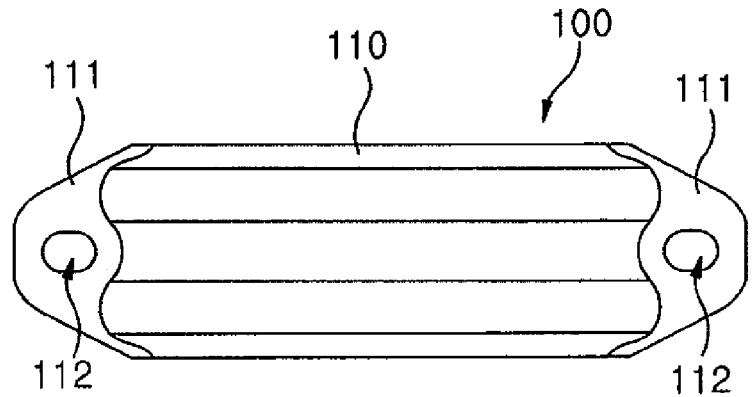
FIG. 6 is a plan view of the pipe coupling according to one embodiment of the present invention.

FIG. 6 is a plan view of the pipe coupling according to one embodiment of the present invention. Hereinafter, for the convenience of explanation, only the constitution of the first half member 110 will be explained.

The connecting hole 112 disposed on the flange 111 of the first half member 110 is of an elliptical shape, wherein the direction of the major axis of the elliptical connecting hole is parallel with the first edge 116a or the second edge 116b, i.e. perpendicular to the y-z plane. Also, the cross section of the head 201a of the bolt 201 corresponding to the connecting hole 112 is also of an elliptical shape.

When the bolt 201 is tightened by the nut 202, the head 201a of the bolt 201 is fixed into the connecting hole 112 of the flange 111 to prevent rotation of the bolt 201. Therefore, the nut-tightening process can be completed by rotating the nut 202 only without extra bolt-fixing apparatus.

Also, the column 201b of the bolt 201 can be moved into the direction of the major axis within the connecting hole 112 of an elliptical shape. Therefore, when the first half member 110 and the second half member 120 are slidably tightened, the gap between the connecting hole 112 and the column 201b enables the first and second half members 110 and 120 to slide.

Figure 7:
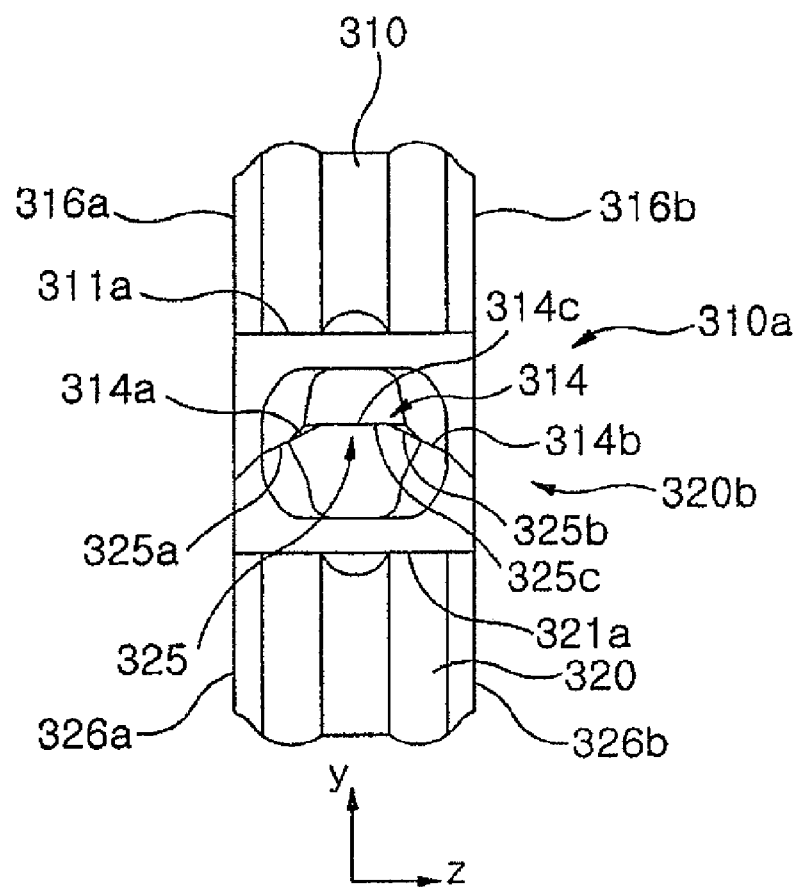
FIG. 7 is a side view of the pipe coupling according to another embodiment of the present invention.

FIG. 7 is a side view of a pipe coupling according to another embodiment of the present invention. The pipe coupling according to another embodiment of the present invention has the same function and effect as the pipe coupling according to one embodiment of the present invention. Therefore, hereinafter, only the differences between the embodiments will be explained.

The circumferential groove 314 disposed on the first end 310a is composed of a first groove surface 314a inclined over a first edge 316a (i.e. x-y plane) of the first half member 310; a second groove surface 314b inclined over a second edge 316b (i.e. x-y plane) of the first half member 310; and a third groove surface 314c perpendicular to both edges 316a and 316b, and connecting the first groove surface 314a and the second groove surface 314b.

The circumferential protrusion 325 disposed on the second end 320b of the second half member 320 is composed of a first protrusion surface 325a inclined over a first edge 326a (i.e. x-y plane) of the second half member 320; a second protrusion surface 325b inclined over a second edge 326b (i.e. x-y plane) of the second half member 320; and a third protrusion surface 325c perpendicular to both edges 326a and 326b, and connecting the first protrusion surface 325a and the protrusion surface 325b.

The first groove surface 314a of the first half member 310 corresponds to the first protrusion surface 325a of the second half member 320; the second groove surface 314b of the first half member 310 corresponds to the second protrusion surface 325b of the second half member 320; and the third groove surface 314c of the first half member 310 corresponds to the third protrusion surface 325c of the second half member 320.

Also, the shape of the circumferential protrusion disposed on the second end of the first half member 310 is the same as that of the circumferential protrusion 325 disposed on the second end 320b of the second half member 320; and the shape of the circumferential groove disposed on the first end of the second half member 320 is the same as that of the circumferential groove 314 disposed on the first end 310a of the first half member 310. Therefore, the same explanations on the circumferential protrusion of the first half member 310 and the circumferential groove of the second half member 320 are omitted.

The third groove surface 314c of the circumferential groove 314 of the first half member 310 is inclined over the flange surface 311a or 321a (i.e. x-z plane) in the same angle and direction as the third protrusion surface 325c of the circumferential protrusion 325 of the second half member 320.

From the above embodiments for the present invention, it is noted that modifications and variations can be made by a person skilled in the art in light of the above teachings. Therefore, it should be understood that changes may be made for a particular embodiment of the present invention within the scope and the spirit of the present invention outlined by the appended claims.

What is claimed is:

1. A pipe coupling comprising a pair of half members which have a half-ring shape on an x-y plane and a thickness along a z-axis,
    the half member comprising:
        a first end on which a circumferential groove is disposed, wherein the circumferential groove comprises a first groove surface and a second groove surface which are inclined over the x-y plane; and
        a second end on which a circumferential protrusion is disposed, wherein the circumferential protrusion comprises a first protrusion surface and a second protrusion surface which are inclined over the x-y plane,
    wherein the first groove surface and the second groove surface are inclined over the x-z plane in the same angle and direction as the first protrusion surface and the second protrusion surface,
    wherein the first end comprises a third groove surface perpendicular to the x-y plane between the first groove surface and the second groove surface,
    wherein the second end comprises a third protrusion surface perpendicular to the x-y plane between the first protrusion surface and the second protrusion surface, and
    wherein the third groove surface is inclined over the x-y plane in the same angle and direction as the third protrusion surface.

2. The pipe coupling according to claim 1,
    wherein the half member further comprises flanges disposed at the first end and the second end, and having an elliptical connecting hole, and
    wherein a major axis of the elliptical connecting hole is perpendicular to y-z plane.

3. The pipe coupling according to claim 2,
    wherein the flanges include first flanges disposed at one of the pair of the half members and second flanges disposed at another one of the pair of the half members, the first flanges corresponding with the second flanges via bolts,
    wherein the flanges are tightened by adjusting nuts coupled with the bolts so as to tighten the pipe coupling.

* * * * *